Patented Oct. 24, 1944

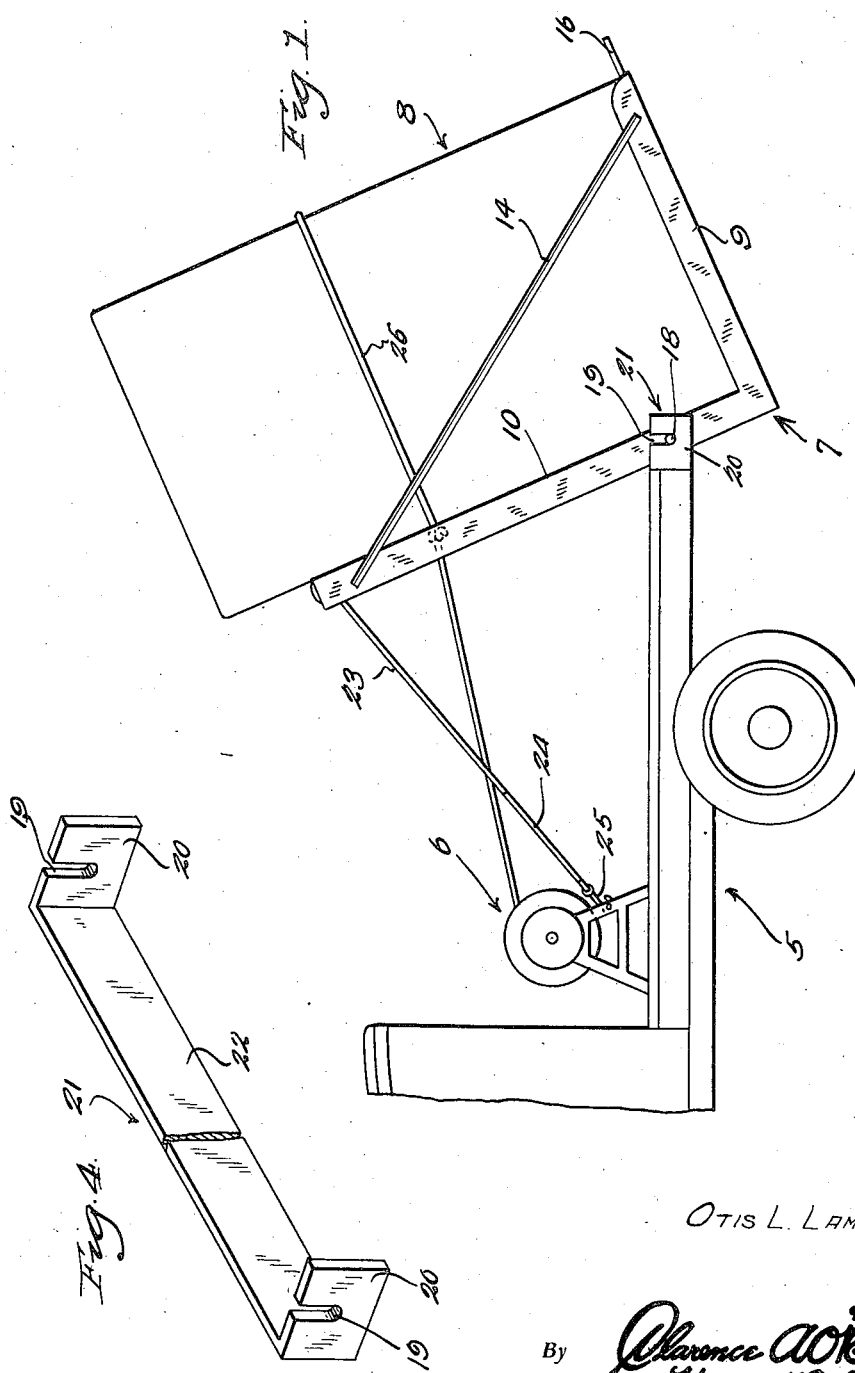

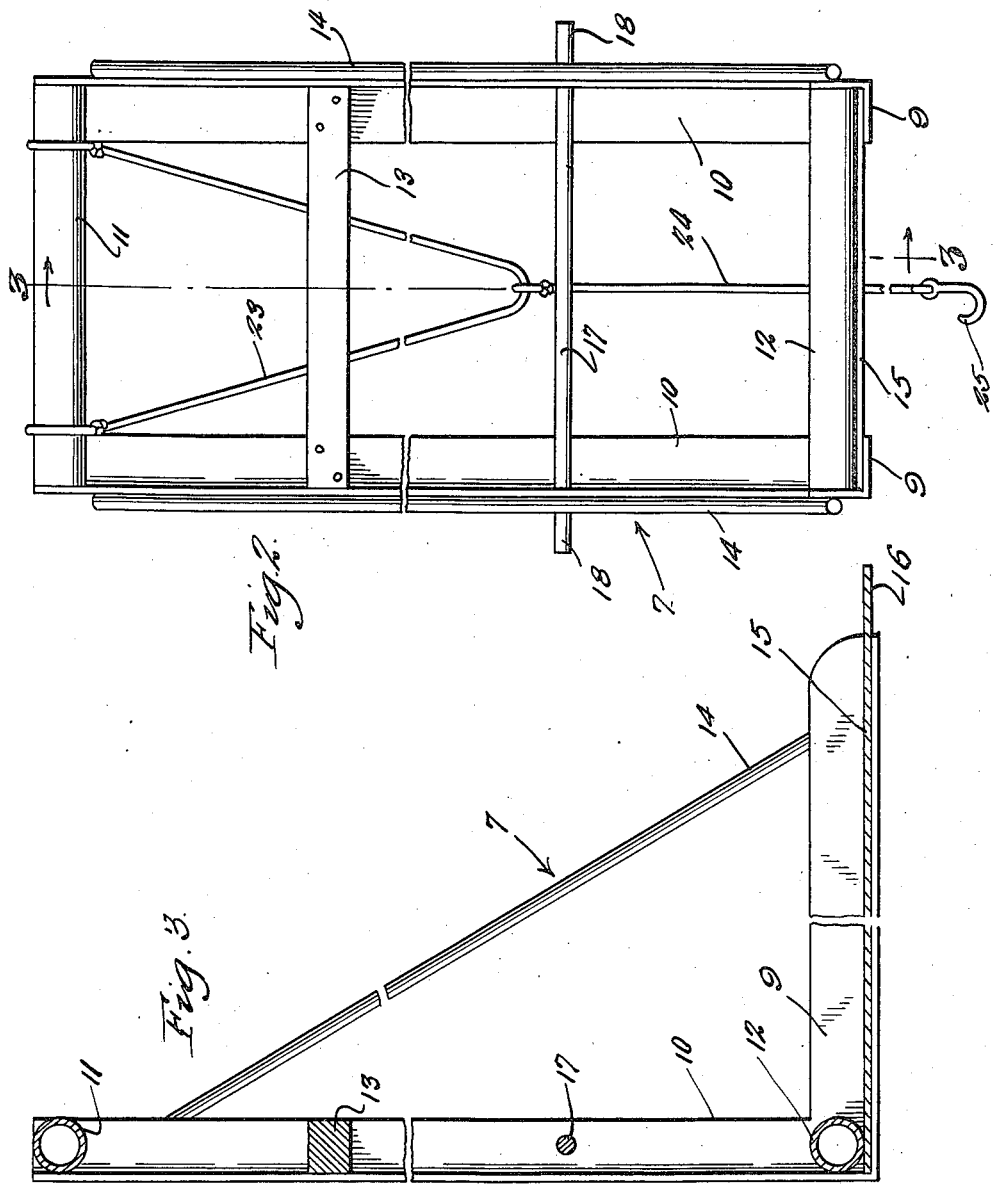

2,361,110

UNITED STATES PATENT OFFICE 2,361,110

LOAD HANDLING AND TRANSPORTING CRADLE

Otis L. Lammey, Memphis, Tenn.

Application October 16, 1943, Serial No. 506,595

4 Claims. (Cl. 214—77)

This invention relates to a novel and improved load handling and transporting cradle such as is expressly, though not necessarily, adapted for use by transfer companies specializing in trucking, hoisting and similar heavy-duty tasks.

One object of the invention is the provision of a simple and expedient structural arrangement which is such as to minimize original purchase and installation costs, the preferred embodiment of the structure being such as to enable it to be attached to or detached from the truck in a few minutes' time.

A further object of the invention is predicated upon the adoption and use of a simple and satisfactory adapter attachment applicable to the rear load handling end of the truck or other vehicle, whereby to simplify the total structural assemblage and to obviate the necessity of securing the cradle permanently, thus permitting independent use of the truck for customary purposes.

Another object has to do with the adoption and use of a structural arrangement of the aforementioned type which is capable of handling, on a relatively small and one and one-half ton truck, better than 6000 pounds of weight.

Further, in adopting the device to be hereinafter specifically covered, I have had in mind safe-handling of unwieldy and lengthy objects and loads, provision being made so that when the cradle is in an outwardly and downwardly tilted position, it temporarily functions as a chute to thus expedite discharging of the load.

The structure in addition to eliminating hazards of loading and unloading of top-heavy machinery, cuts handling time and labor to a minimum, is counterbalanced and so designed and arranged as to not only facilitate the initial placement of the load, but to insure its being satisfactorily held in place in transit.

Another equally important purpose and object of the particular style of cradle adopted resides in the fact that it can be ingeniously used in sled-like fashion after being bodily detached from the transporting or carrying truck, thus making it possible to strap or tie the load on the then detached cradle and to slide the cradle and load unitarily toward the truck by way of a windlass on the truck and obviating, by so doing, attaching skids and the like to the load for purposes of dragging over the floor in the direction of the truck for loading, as is customarily done.

Other features and advantages of the invention will become more readily apparent from the following description and the accompanying illustrative drawings.

In the drawings, wherein like numerals are employed to designate like parts throughout the views—

Figure 1 is a side elevational view showing a fragmentary portion of a conventional truck provided with a suitable windlass or winch, the truck being equipped with the attachable and detachable cradle as constructed in accordance with the principles of this invention.

Figure 2 is a rear elevational view of the cradle per se bodily detached from the transporting truck.

Figure 3 is a central vertical section on the plane of the line 3—3 of Figure 2.

Figure 4 is a perspective view of the adapter fixture which goes on the rear end of the transporting truck to accommodate the load handling cradle.

Referring now to the drawings by reference numerals it will be observed that the conventional short base truck is denoted by the numeral 5. The windlass or winch is indicated at 6 and the cradle at 7. The cradle is adapted to handle the load 8 such as, for instance, a heavy safe, crated refrigerator or other heavy and unwieldy load as the case may be. From a general side elevational point of view, the cradle may be said to be of approximate L-shaped design or configuration. As a matter of fact it is made up principally of two L-shaped angle irons disposed in opposed spaced parallelism. The short limbs are indicated at 9 and the upstanding longer limbs at 10. The upper ends of the limbs 10 are joined by a connecting pipe 11 and a similar pipe 12 is interposed between the junctive portions of the respective L-shaped members as brought out in the drawings. There is another rectangular cross-piece 13 intermediate the ends of the long limbs 10. The elements 14 are diagonal brace rods connected with the respective limbs of the L-parts. It will be noticed that there is a flat bottom plate 15 and this is mounted between the horizontal flanges of the limbs 9 the same being of a length greater than the limbs and projecting outwardly beyond the rear ends of the limbs 16. I also direct attention to a horizontal rod 17 located between the parts 12 and 13 for proper counterbalancing of the cradle as a unit. This serves not only as a reinforcing member but it has its ends 18 projecting beyond the limbs 10 to function as hinge and supporting pintles. These pintles are adapted to occupy the keeper or seating notches 19 in the laterally directed ends 20 of the U-shaped adapter bracket 21. The central or bight portion 22 of this is suitably attached to the rear end of the platform of the truck in an evident manner.

The upper brace or pipe member 11 serves ideally for tying of the free ends of the looped cable or rope 23 thereto. This rope is provided with a reach section 24 terminating in a hook 25 which is adapted to be attached to the stand of the windlass to function as a stay and to thus hold the cradle in the tilted carrying position brought out in Figure 1. In practice another cable or rope 26 is wrapped around the load and attached to the frame structure of the cradle, this being, in turn, wound on the drum of the windlass which windlass, incidentally, may be either hand or power operated. This arrangement serves to rock the cradle back and forth and to serve as a tow line if and when necessary.

It is evident that when the load strikes the back bumper 13 on the cradle, the cradle tilts back to the load-carrying position far enough for the safety line to be hooked into a suitable part of the stand of the winch as shown. It is then advisable to let out the winch line or cable until the safety line carries or retains approximately half of the load. Then the assembly is ready for transportation purposes.

It is to be pointed out that this cradle has been actually constructed and put into use and serves well under many and varied tasks. On light weight trucks the cradle will carry 6000 or more pounds. By using heavier trucks it can handle up to 12,000 pounds and it keeps the load adjacent to the ground or surface. Top-heavy pieces are handled with ease. Machinery and the like can be moved without attaching skidding blocks or sleds. The cradle itself can be used as a sled if and when desired. It can be handled to move and shift pieces to and from platforms as well as from ground level or sidewalks. It works easily in congested down-town districts and requires a minimum parking space. It eliminates the danger of damaging equipment by not having to use skids to and from ordinary trucks or moving equipment.

It is thought that persons skilled in the art to which the invention relates will be able to obtain a clear understanding of the invention after considering the description in connection with the drawings. Therefore, a more lengthy description is regarded as unnecessary.

Minor changes in the shape, size, and arrangement of details coming within the field of invention claimed may be resorted to in actual practice, if desired.

Having described the invention, what is claimed as new is:

1. In a load handling and transporting cradle of the class described, a frame structure comprising a pair of opposed parallel L-shaped angle irons, means connecting the angle irons in assembled relationships, and a horizontal plate attached to the horizontal flanges of the lower limbs of said angle irons, together with a horizontal rod member secured to side flanges of the long limbs of said angle irons at points between the lower ends and centers of said long limbs, said rod having its outer ends extending beyond said angle irons to function as hinging and supporting pintles.

2. In a structure of the class described, in combination, a truck, a windlass on said truck, hanger means on the truck, a sled-like load-receiving and transporting cradle including bottom rails, and means on said cradle above said bottom rails adapted to coact with said hanger means for hingedly and detachably mounting the cradle on the truck, said windlass being operable to move the cradle over the ground with the cradle resting on said bottom rail for transporting a load to the truck and to tilt the load and cradle forwardly when the loaded cradle is mounted on the truck.

3. In a structure of the class described, in combination, a truck including a wheel-supported platform, a windlass on said platform, hanger means on the rear end of the platform, a sled-like load-receiving and transporting cradle detachably and rockably mounted on said hanger means, said windlass having a line for engagement with the load and the cradle to forwardly tilt the same when mounted on the platform, and a safety line attached to the top of the cradle, said safety line being provided on its free end with a hook adapted to be anchored on the windlass to hold the load and cradle forwardly tilted, said windlass further being operable to move the cradle in sled fashion for transporting a load to the platform when the cradle is detached from the latter.

4. In a structure of the class described, a truck platform, a substantially U-shaped bracket having a horizontal intermediate portion rigidly attached to the rear end edge of the truck platform, the end members of said bracket projecting rearwardly and being provided with notches in their upper edges said notches constituting keeper seats, and a cradle adapted for use in sled fashion to transport a load to the truck platform, said cradle being provided with outstanding pintles at opposite sides of its front portion and near the bottom of the same, said pintles being removably seated in said keeper seats.

OTIS L. LAMMEY.